(12) United States Patent
Liu

(10) Patent No.: US 11,443,191 B2
(45) Date of Patent: Sep. 13, 2022

(54) COMPUTING DEVICE AND PARAMETER SYNCHRONIZATION METHOD IMPLEMENTED BY COMPUTING DEVICE

(71) Applicant: Fulian Precision Electronics (Tianjin) Co., LTD., Tianjin (CN)

(72) Inventor: Cheng-Yueh Liu, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 696 days.

(21) Appl. No.: 16/517,916

(22) Filed: Jul. 22, 2019

(65) Prior Publication Data

US 2020/0410359 A1 Dec. 31, 2020

(30) Foreign Application Priority Data

Jun. 28, 2019 (CN) .......................... 201910580500.X

(51) Int. Cl.
*G06N 3/08* (2006.01)
*G06N 3/10* (2006.01)
*G06F 16/27* (2019.01)

(52) U.S. Cl.
CPC ............. *G06N 3/084* (2013.01); *G06F 16/27* (2019.01); *G06N 3/10* (2013.01)

(58) Field of Classification Search
CPC .......... G06N 3/084; G06N 3/10; G06N 3/063; G06N 20/00; G06F 16/27; G06F 9/5066
See application file for complete search history.

(56) References Cited

U.S. PATENT DOCUMENTS

| | | | |
|---|---|---|---|
| 9,038,088 B2 * | 5/2015 | Phull ..................... | G06F 9/5083 713/400 |
| 2019/0188560 A1 * | 6/2019 | Le ............................ | G06N 3/04 |

\* cited by examiner

*Primary Examiner* — Brandon J Miller
(74) *Attorney, Agent, or Firm* — ScienBiziP, P.C.

(57) ABSTRACT

A parameter synchronization method is implemented in a computing device. The parameter synchronization method includes importing a deep learning training task of a preset model into a server communicatively coupled to the computing device, recording a preset number of iterative processes during the deep learning training, dividing each iterative process into a number of phases according to time, determining whether a time ratio of an H2D phase, a D2H phase, and a CPU phase in each iterative process is greater than a preset value, and confirming the server to use a copy mode for performing parameter synchronization when the time ratio of the H2D, D2H, and CPU phases is determined to be greater than the preset value.

16 Claims, 4 Drawing Sheets

COMPUTING DEVICE AND PARAMETER SYNCHRONIZATION METHOD IMPLEMENTED BY COMPUTING DEVICE

FIELD

The subject matter herein generally relates to parameter synchronization, and more particularly to a parameter synchronization method implemented by a computing device.

BACKGROUND

Generally, deep learning requires a large number of computer clusters for distributed computing. Computers in the computer clusters need to frequently exchange parameters. There is also a large amount of data exchange between a GPU and a CPU of each computer. It is difficult to analyze data of the GPU and the CPU at the same time, which affects efficiency of parameter synchronization and limits cross-platform services.

BRIEF DESCRIPTION OF THE DRAWINGS

Implementations of the present disclosure will now be described, by way of embodiments, with reference to the attached figures.

DETAILED DESCRIPTION

Figure 1:
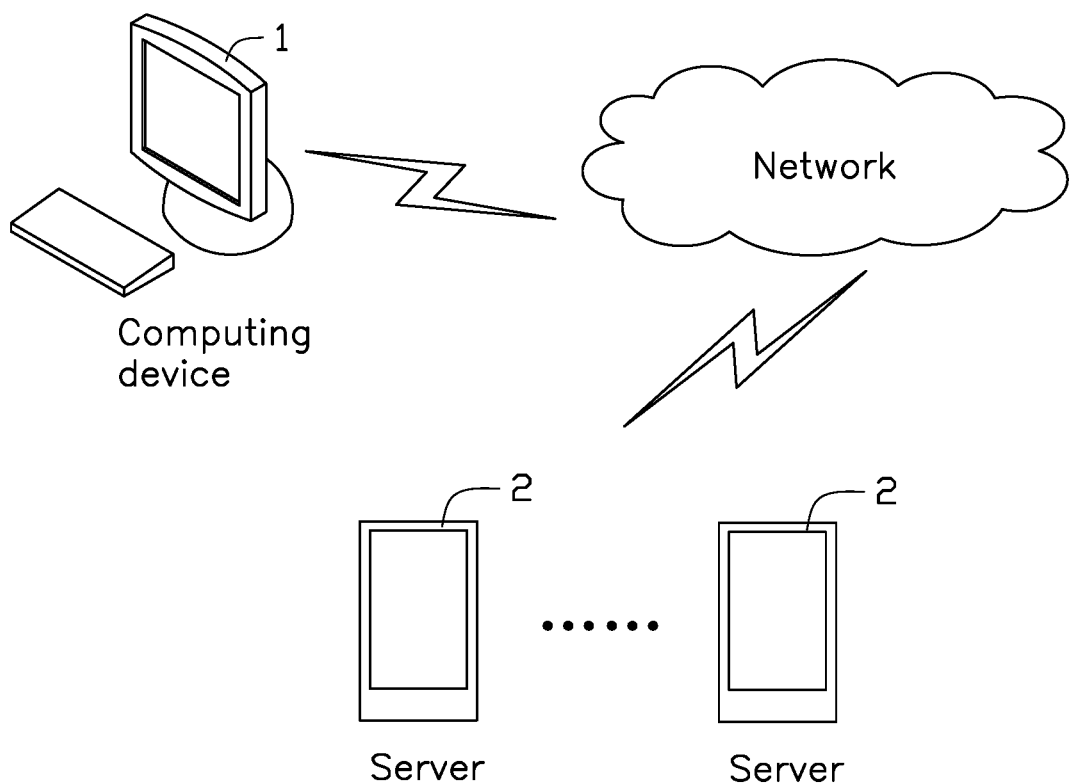
FIG. 1 is a schematic diagram of an embodiment of an application environment of a parameter synchronization method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an embodiment of an application environment of a parameter synchronization method.

The parameter synchronization method is applied to a computing device 1 which establishes a communication connection with at least one server 2 via a network. The network may be a wired network or a wireless network, such as radio, Wireless Fidelity (WIFI), cellular, satellite, broadcast, and the like.

The computing device 1 may be an electronic device, such as a personal computer or a server. The server may be a single server, a server cluster, a cloud server, or the like.

The server 2 can be a single server, a server cluster, or a cloud server.

Figure 2:
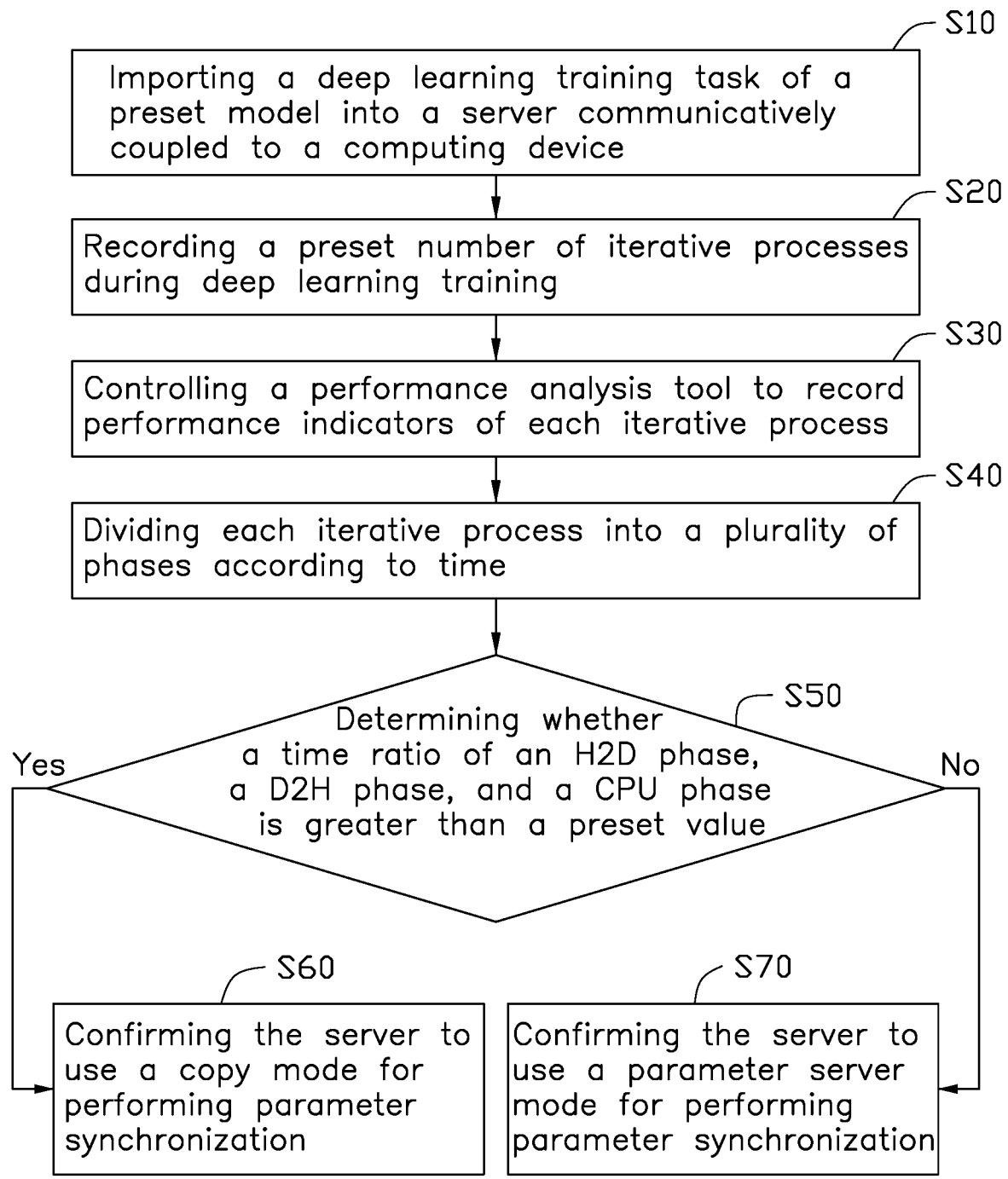
FIG. 2 is a flowchart of a parameter synchronization method.

FIG. 2 shows a flowchart of a parameter synchronization method. The order of blocks in the flowchart may be changed according to different requirements, and some blocks may be omitted.

At block S10, a deep learning training task of a preset model is imported into the server 2 communicatively coupled to the computing device 1.

In one embodiment, the preset model may be a neural network model based on image recognition, financial classification, or the like. After the deep learning training task of the preset model is imported into the server 2, a control performance analysis tool records program traces during a training process. In one embodiment, the performance analysis tool is Swarm-Oriented Function Call Analysis (SOFA).

At block S20, a preset number of iterative processes is recorded during the deep learning training.

Specifically, each iteration trace retrieved by a performance analysis tool SOFA is isolated from each other. Therefore, the preset number of iterative processes is recorded according to the retrieved iteration traces. In one embodiment, the preset number is 10.

At block S30, a performance analysis tool is controlled to record performance indicators of each iterative process.

In one embodiment, the performance indicators include at least a time duration of each iterative process and a Peripheral Component Interface Express (PCIE) bandwidth.

At block S40, each iterative process is divided into a plurality of phases according to time.

In one embodiment, the plurality of phases include at least an H2D phase for a host to copy data to a GPU device, a D2H phase for a GPS device to copy data to the host, a CPU phase for a CPU to work, an FW phase for forward propagation, and a BW phase for backward propagation. The CPU phase is a gap time between every two consecutive iteration processes.

Specifically, at block S40, a plurality of function symbols is preset as identifiers for starting and ending each phase in the iterative process, and then the plurality of phases is generated according to the preset plurality of function symbols. A kernel name includes at least a forward propagation time, a backward propagation time, and data replication.

For example, the H2D phase includes from a first H2D time point to a first FW time point, the FW phase includes from a first FW start time point to a first BW time point, and the BW+D2H phase includes from the first BW time point to a last D2H time point.

At block S50, whether a time ratio of the H2D phase in which the host copies the data to the GPU device, the D2H phase in which the GPS device copies the data to the host, and the CPU phase in which the CPU works in each iterative process is greater than a preset value is determined.

In one embodiment, a time duration of the H2D phase, the D2H phase, and the CPU phase in each iterative process is calculated to determine whether the time ratio is greater than the preset value.

Specifically, a data replication time is estimated according to the retrieved iterative traces and a system configuration. For example, assuming that a size of a data copy is 100 MB in each iterative process and the above-determined PCIE bandwidth is 10 GB/s, the time duration of the data copy is 1 ms. Thus, the time duration of each phase is calculated according to the size of the data replication amount of each phase and the bandwidth of each phase. A sum of the time durations of the H2D, D2H, and CPU phases is calculated, and whether the ratio of the sum of the time durations to a total time of the iterative process is greater than the preset value is determined.

In one embodiment, the preset value is 40%. In other embodiments, the preset value may be set to other values according to requirements.

At block S60, the plurality of servers 2 is confirmed to use a copy mode for performing parameter synchronization when the time ratio of the H2D, D2H, and CPU phases is determined to be greater than the preset value.

In one embodiment, when the time ratio of the H2D, D2H, and CPU phases is greater than the preset value, this indicates that a majority of time in each iterative process is occupied by the CPU working and the CPU exchanging data with the GPU. Thus, the computing device 1 sends a control command to the plurality of servers 2 to control the plurality of servers 2 to use the copy mode to perform parameter synchronization. In the copy mode, deep learning parameters are updated in the plurality of servers 2 by means of the plurality of servers 2 performing data replication among the plurality of servers 2, so that a workload by the CPU and the GPU is reduced.

At block S70, the plurality of servers 2 is confirmed to use a parameter server mode for performing parameter synchronization when the time ratio of the H2D, D2H, and CPU phases is determined to be less than or equal to the preset value.

In one embodiment, when the time ratio of the H2D, D2H, and CPU phases is less than or equal to the preset value, this indicates that a majority of time in each iterative process is occupied by the FW phase and the BW phase. Thus, the computing device 1 sends a control command to the plurality of servers 2 to control the plurality of servers 2 to use the parameter server mode for performing parameter synchronization. In the parameter server mode, deep learning parameters are updated in the plurality of servers 2 by means of the plurality of servers 2 requesting the computing device 1 to send the updated deep learning parameters to the plurality of servers 2 in a queue, so that a utilization rate of the CPU and the GPU is improved.

In one embodiment, the parameter synchronization method may further include outputting a notification for improving system configuration. For example, if the time ratio of the H2D, D2H, and CPU phases is greater than the preset value, the notification notifies to add a server or increase bandwidth. If the time ratio of the H2D, D2H, and CPU phases is less than or equal to the preset value, the notification notifies to remove a server or reduce bandwidth.

Figure 3:
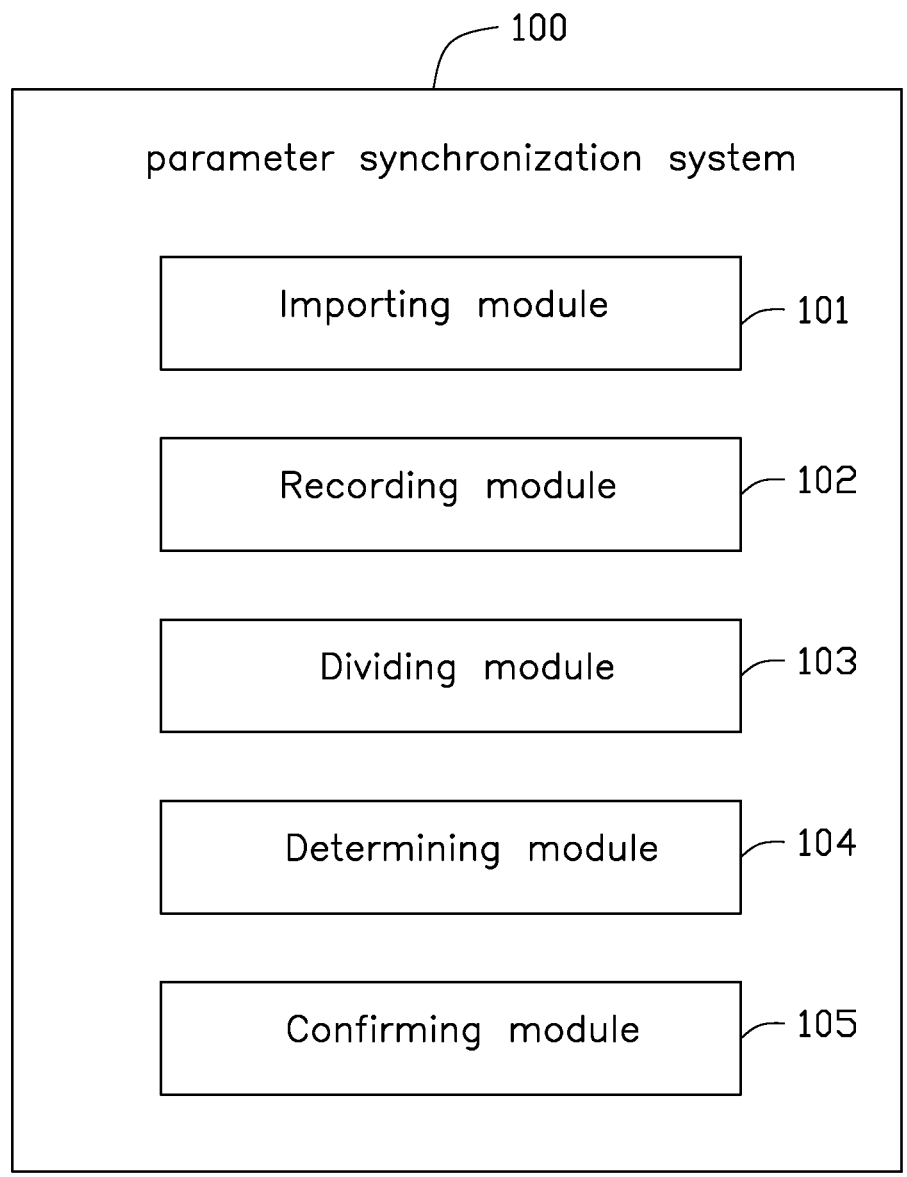
FIG. 3 is a block diagram of an embodiment of a parameter synchronization system.

FIG. 3 shows a block diagram of an embodiment of a parameter synchronization system. In one embodiment, the parameter synchronization system 100 operates in the computing device 1. The computing device 1 is communicatively coupled to the plurality of servers 2 via a network. The parameter synchronization system 100 may include a plurality of functional modules composed of program codes. The program codes of each of the plurality of functional modules may be stored in a memory of the computing device 1 and executed by a processor of the computing device 1 to implement functions of the parameter synchronization system.

The plurality of modules of the parameter synchronization system 100 may include an importing module 101, a recording module 102, a dividing module 103, a determining module 104, and a confirming module 105.

The importing module 101 imports a deep learning training task of a preset model into the server 2 communicatively coupled to the computing device 1.

The recording module 102 records a preset number of iterative processes during the deep learning training.

The recording module 102 further controls a performance analysis tool to record performance indicators of each iterative process.

The dividing module 103 divides each iterative process into a plurality of phases according to time.

The determining module 104 determines whether a time ratio of the H2D phase in which the host copies the data to the GPU device, the D2H phase in which the GPS device copies the data to the host, and the CPU phase in which the CPU works in each iterative process is greater than a preset value.

The confirming module 105 confirms the plurality of servers 2 to use a copy mode for performing parameter synchronization when the time ratio of the H2D, D2H, and CPU phases is determined to be greater than the preset value.

The confirming module 105 further confirms the plurality of servers 2 to use a parameter server mode for performing parameter synchronization when the time ratio of the H2D, D2H, and CPU phases is determined to be less than or equal to the preset value.

Figure 4:
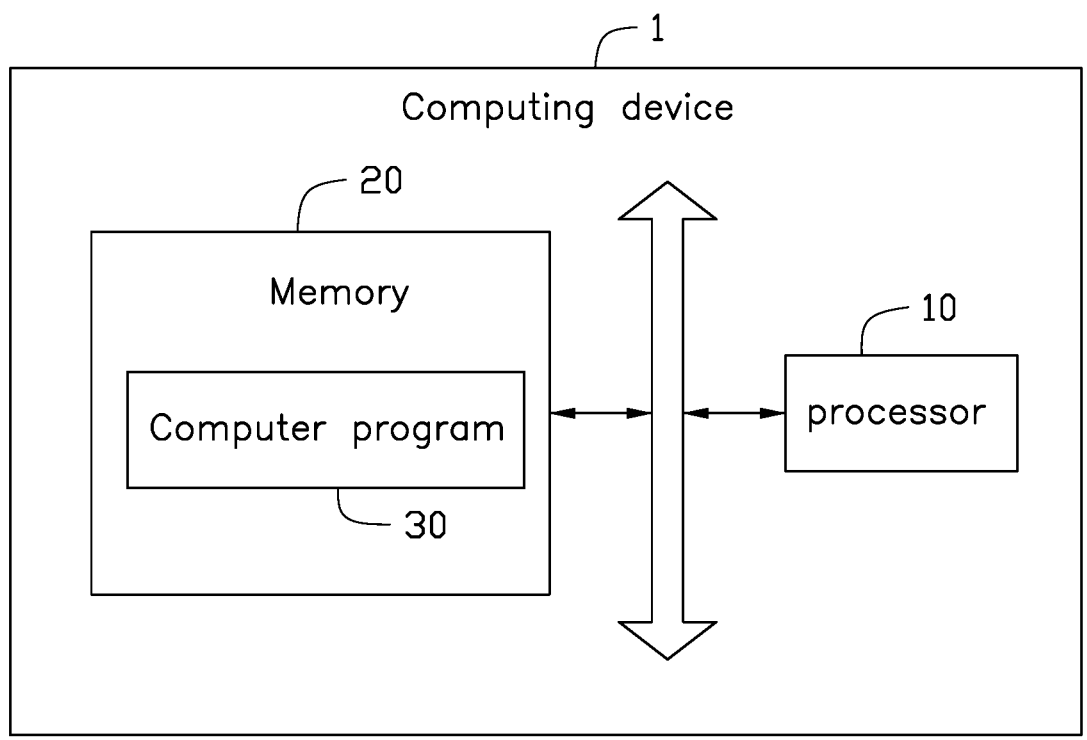
FIG. 4 is a block diagram of an embodiment of a computing device.

FIG. 4 is a block diagram of an embodiment of the computing device 1.

The computing device 1 includes a processor 10, a memory 20, and a computer program 30. The computer program 30 may be the parameter synchronization system 100, which is stored in the memory 20 and executed by the processor 10. When the processor 10 executes the computer program 30, the parameter synchronization method in FIG. 2 may be implemented. Alternatively, when the processor 10 executes the computer program 30, functions of the functional modules in the parameter synchronization system 100 are implemented.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A parameter synchronization method implemented in a computing device, the parameter synchronization method comprising: importing a deep learning training task of a preset model into a server communicatively coupled to the computing device; recording a preset number of iterative processes during the deep learning training task; dividing each iterative process into a plurality of phases according to time, the plurality of phases including at least an Host to Device (H2D) phase for a host to copy data to a Graphics Processing Unit (GPU) device, a Device to Host (D2H) phase for a Global Positioning System (GPS) device to copy data to the host, and a Central Processing Unit (CPU) phase for a CPU to work; determining whether a time ratio of the H2D phase, the D2H phase, and the CPU phase in each iterative process is greater than a preset value; and confirming the server to use a copy mode for performing parameter synchronization when the time ratio of the H2D, D2H, and CPU phases is determined to be greater than the preset value.

2. The parameter synchronization method of claim 1, further comprising:
confirming the server to use a parameter server mode for performing parameter synchronization when the time ratio of the H2D, D2H, and CPU phases is determined to be less than or equal to the preset value.

3. The parameter synchronization method of claim 1, wherein the preset number of iterative processes is recorded during the deep learning training by:
retrieving each iteration trace by a performance analysis tool and isolating each iteration trace; and
recording the preset number of iterative processes according to the retrieved iteration traces.

4. The parameter synchronization method of claim 3, further comprising:
controlling a performance analysis tool to record performance indicators of each iterative process, the performance indicators comprising at least a time duration of each iterative process and a Peripheral Component Interface Express (PCIE) bandwidth.

5. The parameter synchronization method of claim 4, wherein the step of dividing each iterative process into a plurality of phases according to time comprises:
presetting a plurality of function symbols as identifiers for starting and ending each phase in the iterative process; and
generating the plurality of phases according to the preset plurality of function symbols.

6. The parameter synchronization method of claim 5, wherein the step of determining whether a time ratio of the H2D phase, the D2H phase, and the CPU phase in each iterative process is greater than a preset value comprises:
calculating a time duration of each phase in the iterative process and a total time duration of the iterative process; and
calculating the time ratio of the H2D phase, the D2H phase, and the CPU phase according to the total time duration of the iterative process and the time duration of the H2D phase, the D2H phase, and the CPU phase to determine whether the time ratio of the H2D phase, the D2H phase, and the CPU phase in each iterative process is greater than the preset value.

7. The parameter synchronization method of claim 5, wherein:
the function symbols are kernel names; and
each kernel name comprises at least a forward propagation time, a backward propagation time, and data replication.

8. The parameter synchronization method of claim 6, wherein the step of calculating a time duration of each phase in the iterative process comprises:
estimating a data replication time according to the retrieved iterative traces and a system configuration; and
generating an estimated time duration according to the estimated data replication time.

9. A computing device comprising: a processor; and a memory storing a plurality of instructions, which when executed by the processor, cause the processor to: import a deep learning training task of a preset model into a server communicatively coupled to the computing device; record a preset number of iterative processes during the deep learning training; divide each iterative process into a plurality of phases according to time, the plurality of phases including at least an Host to Device (H2D) phase for a host to copy data to a Graphics Processing Unit (GPU) device, a Device to Host (D2H) phase for a Global Positioning System (GPS) device to copy data to the host, and a Central Processing Unit (CPU) phase for a CPU to work; determine whether a time ratio of the H2D phase, the D2H phase, and the CPU phase in each iterative process is greater than a preset value; and confirm the server to use a copy mode for performing parameter synchronization when the time ratio of the H2D, D2H, and CPU phases is determined to be greater than the preset value.

10. The computing device of claim 9, wherein the processor is further caused to:
confirm the server to use a parameter server mode for performing parameter synchronization when the time ratio of the H2D, D2H, and CPU phases is determined to be less than or equal to the preset value.

11. The computing device of claim 8, wherein the processor records a preset number of iterative processes during the deep learning training by:
retrieving each iteration trace by a performance analysis tool and isolating each iteration trace; and
recording the preset number of iterative processes according to the retrieved iteration traces.

12. The computing device of claim 11, wherein the processor is further caused to:
control a performance analysis tool to record performance indicators of each iterative process, the performance indicators comprising at least a time duration of each iterative process and a Peripheral Component Interface Express (PCIE) bandwidth.

13. The computing device of claim 12, wherein the processor divides each iterative process into a plurality of phases according to time by:
presetting a plurality of function symbols as identifiers for starting and ending each phase in the iterative process; and
generating the plurality of phases according to the preset plurality of function symbols.

14. The computing device of claim 13, wherein the processor determines whether a time ratio of the H2D phase, the D2H phase, and the CPU phase in each iterative process is greater than a preset value by:
calculating a time duration of each phase in the iterative process and a total time duration of the iterative process; and
calculating the time ratio of the H2D phase, the D2H phase, and the CPU phase according to the total time duration of the iterative process and the time duration of the H2D phase, the D2H phase, and the CPU phase to determine whether the time ratio of the H2D phase, the D2H phase, and the CPU phase in each iterative process is greater than the preset value.

15. The computing device of claim 13, wherein:
the function symbols are kernel names; and
each kernel name comprises at least a forward propagation time, a backward propagation time, and data replication.

16. The computing device of claim 14, wherein the processor calculates a time duration of each phase in the iterative process by:
estimating a data replication time according to the retrieved iterative traces and a system configuration; and
generating an estimated time duration according to the estimated data replication time.

* * * * *